United States Patent [19]

Ramaswamy et al.

[11] Patent Number: 5,553,093
[45] Date of Patent: Sep. 3, 1996

[54] DISPERSION-COMPENSATED LASER USING PRISMATIC END ELEMENTS

[75] Inventors: Mailini Ramaswamy, Boston; James G. Fujimoto, Cambridge, both of Mass.

[73] Assignee: Massachusetts Institute of Technology, Cambridge, Mass.

[21] Appl. No.: 467,135

[22] Filed: Jun. 5, 1995

Related U.S. Application Data

[63] Continuation of Ser. No. 239,541, May 9, 1994, abandoned.
[51] Int. Cl.$^6$ ........................................................ H01S 3/08
[52] U.S. Cl. .............................. 372/100; 372/18; 372/99; 372/107; 372/108; 372/39; 372/25; 372/11; 372/19; 372/69; 372/26
[58] Field of Search .......................... 372/100, 99, 107, 372/39, 69, 25, 26, 11, 18, 19, 108

[56] References Cited

U.S. PATENT DOCUMENTS

| | | | |
|---|---|---|---|
| 4,970,383 | 11/1990 | Caudle et al. | 372/99 |
| 5,097,471 | 3/1992 | Negus et al. | 372/18 |
| 5,185,750 | 2/1993 | Kafka et al. | 372/18 |
| 5,226,054 | 7/1993 | Yarborough et al. | 372/100 |
| 5,321,717 | 6/1994 | Adachi et al. | 372/100 |
| 5,384,803 | 1/1995 | Lai | 372/100 |

FOREIGN PATENT DOCUMENTS

| | | | |
|---|---|---|---|
| 0492994 | 7/1992 | European Pat. Off. | H01S 3/108 |

OTHER PUBLICATIONS

Duarte et al., "Dispersion Theory of Multiple–Prism Expanders for Pulsed Dye Lasers," Optical Comm., vol. 43, No. 5, pp. 303–307, Nov. 1, 1982.

Dietal et al., "Intracavity pulse compression with glass: a new method of generating pulses shorter than 60 fsec," Opt. Lett. vol. 8, No. 1, pp. 4–6, Jan. 1983.

Fontaine et al., "Chirp in a mode–locked ring dye laser," IEEE Jnl. of Qntm. Elect., vol. QE19, No. 10. pp. 1467–1469, Oct. 1983.

Gordon et al., "Optical resonator with negative dispersion," Opt. Lett. vol. 9, No. 5, pp. 153–155, May 1984.

Fork et al., "Negative dispersion using pairs of prisms," Opt. Lett., vol. 9, No. 5, pp. 150–152, May 1984.

Duarte, "Note on achromatic multiple–prism beam expanders," Opt. Comm., vol. 53, No. 4, pp. 259–262, Mar. 15, 1985.

Valdmanis et al., "Generation of optical pulses as short as 27 femto seconds directly from a laser balancing self–phase modulation, group–velocity dispersion, saturable absorption, and saturable gain," Optics Lett., vol. 10, No. 3, pp. 131–133, Mar. 1985.

(List continued on next page.)

*Primary Examiner*—Leon Scott, Jr.
*Attorney, Agent, or Firm*—Theresa A. Lober

[57] ABSTRACT

A laser resonant cavity defined by a set of reflective end elements positioned to together form a closed optical path, again medium positioned along the closed optical path, means for exciting the gain medium to produce a laser beam within the cavity, at least one focusing element positioned within the cavity in optical alignment with the gain medium, and a prism positioned as one of the end elements of the cavity and providing angular dispersion of the laser beam. The prism, end elements, gain medium, and focusing elements are positioned with respect to each other such that the resonant cavity supports a coexistence of several monochromatic laser modes, each mode having a distinct propagation axis. Propagation axes of modes having relatively longer wavelengths traverse more of the prism than propagation axes of modes having relatively shorter wavelengths, resulting in the addition of a negative component to the group velocity dispersion of the laser cavity. The invention provides group velocity dispersion compensation using one or more prismatic end elements without the need for any additional intracavity elements whose sole purpose is dispersion compensation.

30 Claims, 3 Drawing Sheets

OTHER PUBLICATIONS

Duarte, "Multiple–prism Littrow and grazing–incidence pulsed CO2 lasers," Appl. Opt., vol. 24, p. 1244, May 1, 1985.

Martinez, "Grating and prism compressors in the case of finite beam size," Opt. Soc. Am. B., vol. 3, No. 7 pp. 929–934, Jul. 1986.

Kafka et al., "Prism–pair dispersive delay lines in optical pulse compression," Opt. Lett., vol. 12, No. 6, pp. 401–403, Jun. 1987.

Cruz et al., "Phase correction of femtosecond optical pulses using a combination of prisms and gratings," Opt. Lett., vol. 13, No. 2, pp. 123–125, Feb. 1988.

Nakazawa et al., "Efficient optical pulse compression using a pair of Brewster–angled TeO2 crystal prims," Opt. Soc. Am. B., vol. 5 No. 2, pp. 215–221, Feb. 1988.

Martinez, "Matrix formalism for pulse compressors," IEEE Jnl. of Qntum. Elect., vol. 24, No. 12, pp. 2530–2536, Dec. 1988.

Martinez, "Matrix formalism for dispersive laser cavities," IEEE Jnl. of Qntum. Elect., vol. 25, No. 3, pp. 296–300, Mar. 1989.

Kostenbauder, "Ray–pulse Matrices: A rational treatment for dispersive optical systems," IEEE Jnl. of Qntum. Elect. vol. 26, No. 6, pp. 1148–1157, Jun. 1990.

Li et al., "Picosecond pulse generation in Nd:BEL with a high–frequency acousto–optic modelocker," Opt. Lett., vol. 16, No. 19, pp. 1505–1507, Oct. 1, 1991.

Proctor et al., "quartz prism sequence for reduction of cubic phase in a mode–locked Ti:A12O3 laser," Opt. Lett., vol. 17, No. 18, pp. 1295–1297, Sep. 15, 1992.

Kafka et al., "Picosecond and femtosecond pulse generation in a regeneratively mode–locked Ti:Sapphire Laser," IEEE Jnl. of Qntm. Elect., vol. 28, No. 10, pp. 2151–2162, Oct. 1992.

Szipocs et al., "Chirped multilayer coatings for broadband dispersion control in femtosecond lasers," Opt. Lett., vol. 19, No. 3, pp. 201–203, Feb. 1, 1994.

Stingle et al., "Generation of 11–fs pulses from a Ti:sapphire laser without the use of prisms," Opt. Lett., vol. 19, No. 3, pp. 204–206, Feb. 1, 1994.

Spence et al., "60–fsec pulse generation from a self–mode–locked Ti:sapphire laser," Optics Letters, vol. 16, No. 1, pp. 42–44, Jan. 1, 1991.

Mercer, I. P. et al., "Diode–pumped picosecond Nd:YLF laser oscillator at 1053 nm," Optics Communications, vol. 107, No. 1/2, pp. 77–82, Apr. 1, 1994.

Asaki, Melanie T. et al., "Generation of 11–fs pulses from a self–mode–locked Ti:sapphire laser," Optics Letters, vol. 18, No. 12, pp. 977–979, Jun. 15, 1993.

DISPERSION-COMPENSATED LASER USING PRISMATIC END ELEMENTS

This work is funded by the U.S. Air Force, under Contract No. F49620-91-C0091, and by the Joint Services Electronics Programs, under Contract No. DAAL03-91-0001; the U.S. government may have certain rights to this invention.

This application is a continuation of application Ser. No. 08/239,541, filed on May 9, 1994, now abandoned.

BACKGROUND OF THE INVENTION

This invention relates to lasers, and more particularly relates to techniques for providing compensation of group velocity dispersion in lasers.

Group velocity dispersion is an inherent and well understood characteristic of various laser elements including, for example, the laser gain medium, and this dispersion tends to cause broadening of a short laser pulse. In a modelocked laser, the various frequencies composing short laser pulses generated in the laser cavity tend to disperse when traveling through the cavity due to the positive dispersion of the laser gain medium, which in this case might be, e.g., a titanium-:sapphire gain medium.

To facilitate such short pulsed operation in modelocked lasers, and indeed to reduce or eliminate group velocity dispersion generally, negative dispersion is intentionally introduced into the laser cavity, typically using an element or set of elements designed specifically to compensate for the positive dispersion of other intracavity elements. Perhaps the most common compensation technique uses prism sequences; one or more pairs of appropriately arranged prisms can result in a geometric variation of laser beam path length with wavelength that is equivalent to negative dispersion. The particular orientation of the prisms within each pair ensures that the dispersion is of the appropriate polarity. Use of compensating prism pairs has been analyzed first in femtosecond dye lasers, by Fork et al., in "Negative dispersion using pairs of prisms," Optics Letters, 9, 150, 1984, and has subsequently found widespread use in, e.g., femtosecond solid-state lasers.

Beyond compensation of group velocity dispersion, it is often desirable to prespecify a net negative dispersion in a laser to achieve, for example, soliron-like pulse shaping in a passively modelocked laser. Fork et al., in "Negative dispersion using pairs of prisms," Optics Letters, 9, 150, 1984, have shown theoretically that by varying the spacing between a pair of prisms and the optical path length of a laser beam passing through the prisms, the amount of net group velocity dispersion within a laser cavity can be varied. Negus et al., in U.S. Pat. No. 5,097,471, have demonstrated this using of a pair of prisms to both compensate for positive group velocity dispersion of a gain medium and to further produce a net negative group velocity dispersion in the laser cavity; Negus and several others have demonstrated this in Kerr Lens Modelocked Ti:Sapphire lasers. Kafka et al., in U.S. Pat. No. 5,185,750, have also demonstrated the use of a compensating prism pair, using two Brewster prisms placed in a laser cavity at Brewster's angle and arranged so that the second prism recollimates the divergent spectral components coming from the first prism.

Gordon et al., in "Optical resonator with negative dispersion," Optics Letters, 9, 153, 1984, have proposed an alternative approach for dispersion compensation using a laser geometry involving a theoretical double-mirror, ring resonator design that incorporates one intracavity prism for producing a prespecified resonator dispersion of either polarity. Gordon shows that based on proper positioning of the prism, the ring resonator geometry can allow for co-existence of more than one monochromatic laser mode, each with a displaced propagation axis, and so can provide a large degree of negative dispersion, if the cavity lengths are appropriately chosen.

While such a prism scheme and the prism pair schemes described above for laser cavities are recognized as effective means of dispersion compensation, these schemes pose serious constraints on laser geometry and capabilities. The primary limitation is that of complexity and the constraints in design imposed by requiring two or more extra intracavity elements, namely, the compensating prisms, separated by a substantial distance, in addition to the gain, focusing, and reflective end elements inherently required of a laser design. These additional elements increase intracavity loss, alignment complexity, and the cost of manufacture. Commonly used prism materials such as LAKL21 glass, fused silica, or SF10 glass require, by the nature of their dispersive properties, a significant inter-prism spacing to achieve the requisite negative dispersion. Indeed, the double-mirror ring resonator of Gordon described above would require a cavity length in excess of 2 meters to compensate for the material dispersion of just 4 mm of quartz, which is less dispersive than the commonly used Ti:Sapphire gain medium. As a result of such prism separation requirements, femtosecond Kerr Lens Modelocking lasers have historically always used a so-called folded X or Z cavity configuration, with a gain medium located in a converging fold and a prism sequence located in one arm of the cavity. This geometry and prism separation requirements have constrained femtosecond Kerr Lens Modelocking lasers to date to operation in the 100 MHz repetition rate range.

As an alternative group velocity dispersion compensation scheme, Kafka et al., in U.S. Pat. No. 5,185,750, have demonstrated the use of a Gires-Tournois interferometer positioned intracavity. While such a scheme is shown to be effective, a Gires-Tournois interferometer is limited in its ability to operate over wide bandwidths, and consequently cannot be readily used in, e.g., extremely short pulse lasers. Furthermore, interferometers are inherently delicate structures and thereby increase the complexity and cost of lasers they are used in.

Recently, Stingl et al., in "Generation of 11 fs pulses from a Ti:Sapphire laser without using prisms," Optics Letters 19, 204, 1994, have demonstrated the use of mirrors, rather than prisms, as compensation elements; interference of light reflected from multi-layer dielectric stacks at the mirrors' surfaces provides the requisite negative dispersion. Like the other dispersion compensation schemes described above, this compensation approach has its own limitations. For example, each mirror can provide only a limited and fixed quanta of dispersion compensation. As a result, the mirror dispersion can only be varied in discrete dispersion quanta, and a complicated system of intracavity mirrors is required to obtain a desired net dispersion.

SUMMARY OF THE INVENTION

The present invention features a laser resonant cavity defined by a set of reflective end elements positioned together form a closed optical path, a gain medium positioned along the closed optical path, means for exciting the gain medium to produce a laser beam within the cavity, and at least one focusing element positioned within the cavity in optical alignment with the gain medium. In the invention, a prism is positioned as one of the end elements of the cavity, and provides angular dispersion of the laser beam. The prism has two surfaces at an angle with respect to each other, at least one the surfaces being coated with a reflective coating. The prism, end elements, gain medium, and focusing elements are positioned with respect to each other such that the resonant cavity supports a coexistence of several monochromatic laser modes, with each mode having a distinct propagation axis. Propagation axes of modes having relatively longer wavelengths traverse more of the prism than propagation axes of modes having relatively shorter wavelengths, resulting in the addition of a negative component to the group velocity dispersion of the laser cavity.

The laser of the invention achieves group velocity dispersion compensation using one or more prismatic end elements without the need for any additional intracavity elements whose sole purpose is dispersion compensation. The prismatic end elements of the invention enforce the spatial separation of propagation axes over all or a large fraction of the cavity length, thereby providing for a simple and compact laser that achieves dispersion compensation without the introduction of any additional elements or complexity into the resonator geometry. Minimization of the requisite number of laser components reduces the cost of manufacture and increases the ease of day-to-day alignment and use. Further, and importantly, as a result of the use of prismatic end elements for dispersion compensation, the laser of the invention is shown to attain an order of magnitude increase in repetition rate over the past generation of femtosecond lasers.

In preferred embodiments of the invention, the prism is distinct from the gain medium of the laser, and preferably, only one focusing element is positioned in the resonant cavity and the prism functions as an output coupler for extracting the laser beam from within the resonant cavity. Preferably, the gain medium is solid state or a semiconductor medium. The gain medium is excited by a diode pump or a laser pump. Preferably, the gain medium is a crystal having two surfaces at an angle with respect to each other such that the crystal is flat-Brewster cut, and preferably, the gain medium is a titanium:sapphire crystal. It is preferred that the gain element be positioned a distance of about one focal length from the focusing element. In other preferred embodiments, the prism positioned in the laser cavity is characterized by an index of refraction n, where $n=n(\lambda)$, $\lambda$ being a laser mode wavelength. Preferably, the two surfaces of the prism are at the complement of the Brewster angle for the prism, being preferably LAKL21 glass or SF10 glass. It is preferred that the prism be positioned a distance from the focusing element that is sufficient to provide net negative intracavity dispersion.

In other preferred embodiments, the laser comprises a short pulse modelocked laser, preferably a passively modelocked laser, and most preferably a Kerr-lens modelocking laser. Preferably, the laser produces a pulsed laser beam of less than one picosecond in duration at a repetition rate of greater than 100 MHz.

Such a laser source is in great demand in the fields of instrumentation and measurement technology, which employ short laser pulses to measure, for example, high speed transient optical or electronic signals. And further, the fields of high speed communications and information processing find a broad range of applications for a compact, efficient laser pulsing source.

Other features and advantages of the invention will be apparent from the following description of a preferred embodiment, and from the claims.

DESCRIPTION OF THE PREFERRED EMBODIMENT

Figure 1:
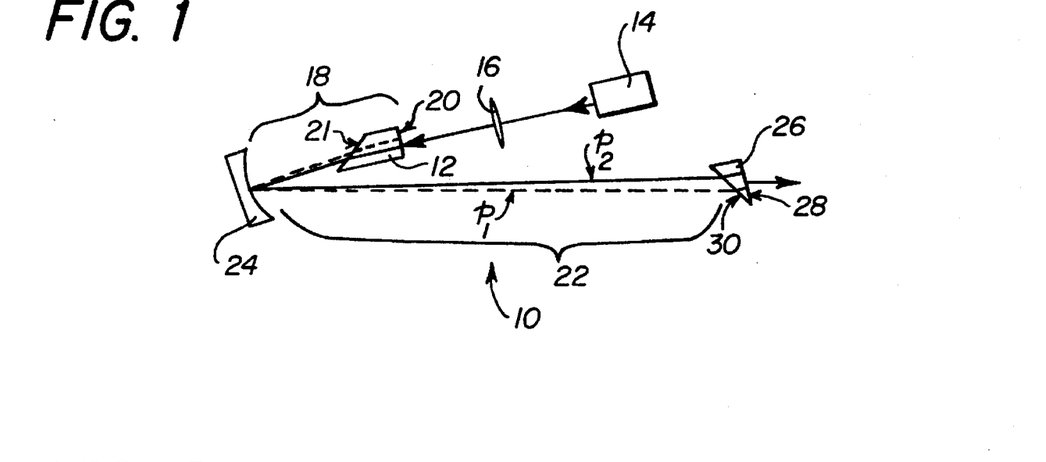
FIG. 1 is a schematic diagram of a laser according to one embodiment of the invention.

Referring to FIG. 1, there is schematically shown one laser 10 illustrating the dispersion compensation principles of the invention. In one embodiment, this laser is designed to operate as a Kerr Lens Modelocking laser. As such, the laser employs a gain medium 12 of, for example, titanium:sapphire. The gain medium is pumped by a pump laser 14, such as an Argon laser; available from Coherent Laser Inc. as an INNOVA 310 small frame laser. The pump laser is focused into the gain medium with a plano-convex lens 16. This pump laser-lens-gain medium configuration provides saturable absorber action through operation based on the Kerr-lens self-focusing property of the gain medium, in combination with the effective aperture formed by the focused laser pump beam.

The titanium:sapphire gain medium 12 here is a prismatic element doped 0.25% Titanium by weight; measuring 3.17 mm on its shortest side and 5.96 mm on its longer side. The length of the crystal is chosen such that it is short enough to minimize the positive material dispersion it inherently introduces in the cavity, but long enough to ensure sufficient absorption of energy from the pump beam to sustain lasing at satisfactory power levels. Such a crystal is available from Union Carbide Chemicals and Plastics Company, Inc., Crystal Products Group, Washougal, Wash. One face 20 of the medium, that face which faces the pump laser 14 is coated with a material such that the face is transmissive at pump wavelengths and is highly reflective over a range of lasing wavelengths, in this case from 700 nm to 850 nm, which is contained within the emission spectrum of the titanium:sapphire gain medium. Such a coating is available from Lightning Optical Corp. Tarpon Springs, Fl. The angle between the faces of the gain element is the complement of the Brewster angle for sapphire, 29.6 degrees; it is well known that a Brewster cut minimizes intracavity reflective losses from the uncoated gain element surface 21.

The short cavity arm 18 of the laser intersects with a long arm 22 at a reflective element, here shown as a curved mirror 24 having a 5 cm radius of curvature; available from CVI East, Putnam Conn.. The mirror is positioned at a distance of slightly more than 2.5 cm from the gain medium 12 in the short arm 18 of the laser. This distance is chosen for operation within the geometric stability region of the cavity. A coating covers the mirror such that the mirror surface is highly reflective over a wide bandwidth of wavelengths that generally correspond to the range of lasing wavelengths, that range being here 700 nm to 850 nm.

Light passing through the gain element 12 is reflected from the mirror 24 at an angle of about 22 degrees to the long arm 22 of the laser, in which is positioned a prismatic end element 26. This angle is chosen in an effort to eliminate astigmatic effects in the cavity, and depends on several cavity parameters, namely, the gain material, the gain crystal length and the radius of curvature of the curved mirror. The end element 26 may be made of, for example, a LAKL21 glass substrate, available from Matthews Optical Works, Poulsbo Wash. LAKL21 lends itself well as a substrate because LAKL21 produces a large enough angular dispersion when used as a prismatic end element to yield sufficient group velocity dispersion compensation with a reasonably short arm length, say, about 40 cm. LAKL21 also has the advantage of having relatively low third-order dispersion. As will be recognized by those skilled in the art, the minimization of third-order dispersion is important in achieving very short pulses in the femtosecond regime.

The end element outer surface 28, facing away from the mirror 24 is coated with a 99% reflective material such that the surface is reflective over a broad bandwidth of wavelengths that generally correspond to the range of lasing wavelengths, for example 700 nm to 850 nm here. The reflectivity of this coating is chosen to be high enough to maintain sufficient intracavity pulse energies to support Kerr Lens Modelocking, but low enough to provide reasonable average power extraction from the laser cavity. The outer surface 28 and inner surface 30 of the end element are at the complement of the Brewster angle, for the particular material of the element, with respect to each other; for a LAKL21 substrate, the Brewster angle is 58.5 degrees, and its complement is therefore 31.5 degrees.

The prismatic end element 26 is positioned in the long arm 22 a distance from the mirror such that the end element ensures a net negative intracavity group velocity dispersion for the laser without the need for or use of any additional compensation elements positioned within the cavity. The method for calculation of this distance is developed in the analysis below. Additionally, in this particular laser configuration, the prismatic end element is an output coupler for extracting the generated laser beam from the laser cavity. Thus, this laser geometry provides effective dispersion compensation in a compact and elegantly simple configuration.

Considering the operating principles of this laser, being a Kerr Lens Modelocked laser it is designed to produce very short laser pulses, in the femtosecond or picosecond regime, through passive modelocking. Passive modelocking operation is based on the use of an intensity-dependent loss mechanism, or saturable absorber mechanism, in the laser. This mechanism results in the favoring of pulsed operation over continuous wave operation; as mentioned above, in a Kerr Lens Modelocked laser spatial mode profile changes induced by nonlinear self focusing are exploited to create this saturable-absorber-like action. As a result, for certain cavity settings, i.e., at certain points in the linear geometric stability map of the cavity, higher intracavity intensities corresponding to the peak of a short laser pulse, present a smaller mode size in the gain medium, and thus are impacted by a higher gain due to better overlap with the focused pump mode. This acts as a pulse shortening mechanism.

Calculation of the self-consistent high-intensity, or nonlinear, intracavity mode can be achieved through several well-established techniques recognized in the art. For example, in this laser design, the self-consistent nonlinear intracavity mode is calculated using an iterative calculation based on scaling of the q-parameter that describes Gaussian beam propagation within the cavity. These calculations establish that for certain cavity settings, higher intracavity intensities have a smaller spot size in the gain medium, and thus experience higher gain due to better overlap with the pump mode. This effect produces a fast saturable action which acts as a pulse shortening force and causes the laser to modelock, or generate short pulses. For the laser of FIG. 1, if the length of the arm containing the gain medium (shown as 18 in FIG. 1) is close to the focal length of the curved mirror 24, the mode size in the gain medium is reduced at high powers.

To achieve such Kerr Lens Modelocking, self-phase modulation of the laser beam is required for the generation of new laser frequencies. These frequencies tend to disperse when traveling through the laser due to group velocity dispersion inherent in, e.g., the gain element medium, and as a result the modelocked pulses tend to broaden. To facilitate the Kerr Lens short-pulse operation, then, it is necessary to minimize the intracavity group velocity dispersion by introducing negative dispersion into the path of the laser pulses. Further, as is known in the art, net negative dispersion is required in the presence of self phase modulation in order to achieve the soliron-like pulse shaping on which short pulse Kerr Lens Modelocking lasers rely. Thus, three mechanisms are required for effective Kerr-lens modelocking, namely, saturable absorber action, self-phase modulation, and negative dispersion.

Considering an analysis for the determination of the net intracavity dispersion of a given laser, e.g., that of FIG. 1, using a prismatic end element for dispersion compensation, one begins with the premise that the broadband intracavity beam in a modelocked laser is the superposition of monochromatic spatial modes each of which propagates along a distinct axis, which will be referred to hereafter as a propagation axis. For each particular wavelength, the corresponding spatial mode is determined using standard resonator mode analysis. The resulting spatial modes identify the intracavity location of beam waists and their relative sizes; for example, the laser of FIG. 1 has beam waists at both end reflecting surfaces (20 and 28 in the figure), with a short confocal parameter, corresponding to a tight focus, in the short cavity arm 18 and a long confocal parameter, corresponding to an almost collimated beam, in the long cavity arm 22.

A given laser geometry can be dispersive if the propagation axes of different monochromatic spatial modes follow different intracavity paths. In calculating the dispersion introduced by a prismatic end element, and the resultant net dispersion of a cavity, it must first be recognized that for a given laser design to exhibit dispersion, of either polarity, as a result of laser geometry, the geometry must allow for simultaneous coexistence of multiple wavelengths in the cavity. The one or more prismatic end elements, in conjunction with the laser geometry, must also spatially displace the propagation axes for the wavelengths. In other words, such a cavity that includes a prismatic end element is neither wavelength-selective nor does it allow for multiple wavelengths to propagate self-consistently along the same axis throughout the resonator. The spatial displacement of propagation axes for different wavelengths results in differing geometrical path lengths within intracavity material; for example, in the prismatic end elements of the invention, which are the origin of dispersion compensation.

To calculate the dispersion for such a laser cavity, the wavelength-dependent optical path length of different propagation axes must be determined. This is done by analyzing the cavity geometry using ray optics to determine the behavior of the propagation axes representing the Gaussian spatial mode of each coexisting wavelength, ignoring the rest of the off-axis rays that make up each Gaussian mode.

Figure 3:
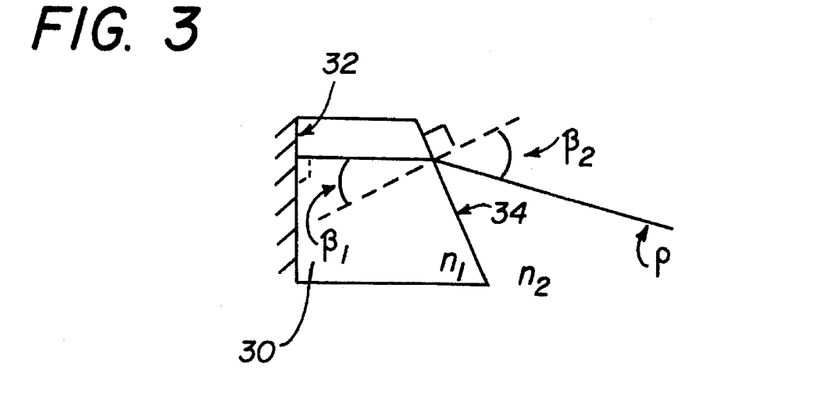
FIG. 3 is a diagram of the geometry of a reflective end element interacting with a propagation axis in a laser according to the invention.

In order to ensure that a laser geometry which includes a prismatic end element is negatively dispersive, the longer wavelengths in the laser must be made to travel a longer distance in the prismatic end element than shorter wavelengths. To understand how this is achieved, consider the path of a propagation axis through a reflective prismatic end element as shown in FIG. 3. A self-consistent round trip intracavity path for axis p must satisfy three geometric constraints. The first is that the axis p must be perpendicular to the reflective face of the end element, shown as face 32. Secondly, the axis p must be deviated at the angled surface of the element, shown as face 34, according to Snell's law:

$$n_1 \sin(\beta_1) = n_2 \sin(\beta_2) \tag{1}$$

where $n_1$ is the wavelength-dependent refractive index of the reflective prismatic end element 30 i.e., $n_1 = n(\lambda)$, and $n_2$ is the refractive index for air, i.e., $n_2 = 1$. $\beta_1$ and $\beta_2$ are the angles, in the end element and in air, with respect to the normal, as shown in FIG. 3.

The third geometric constraint determining the path followed by the propagation axes corresponding to different wavelengths concerns the overall cavity geometry, particularly the positioning of the focusing elements therein. This constraint may be stated as follows: Between the end elements of a resonator, the propagation axis corresponding to each wavelength must obey the laws of ray optics imposed by the focusing elements and any other cavity elements.

Application of these three constraints to the propagation axis of any wavelength coexisting in the cavity will uniquely define a self-consistent intracavity path for each wavelength. For the laser of FIG. 1, under the simplifying assumption of identical materials for the prismatic gain element and the prismatic end element, these constraints dictate that all coexisting propagation axes intersect at the center of the curved mirror or lens. Further, the constraints require that the propagation axes of the various coexisting wavelengths be spatially separated both in the gain medium and in the prismatic end element, the ratio of the axes' separations at the ends of the gain medium and the prismatic end element being approximately the ratio of the two arm lengths of the laser. Since longer wavelengths, with a lower $n(\lambda)$, are deviated less by the angled surfaces of the elements than shorter wavelengths, the self-consistent propagation paths for longer wavelengths traverse more material at both ends of the cavity than that for shorter wavelengths. As will be recognized by those skilled in the art, this difference in material traversal results in negative dispersion.

The inventors herein have recognized that based on this axis separation analysis, one may, through appropriate positioning of a laser cavity prismatic end element, for a given gain medium and lens configuration, produce a compensating dispersion to achieve a desired net intracavity dispersion. This compensating dispersion is achieved without the use of a distinct dispersion compensator, relying instead on the properties of the prismatic end element, which thus acts in a dual role, namely as a dispersion compensation mechanism, and in its inherently intended purpose, that of end reflector. In addition, as shown in the laser of FIG. 1, the prismatic end element may also serve as an output coupler for extracting the laser beam from the cavity, either as a reflective element, as in the long arm 22 of the cavity, or as a gain medium, as in the short arm 18 of the cavity.

Figure 4:
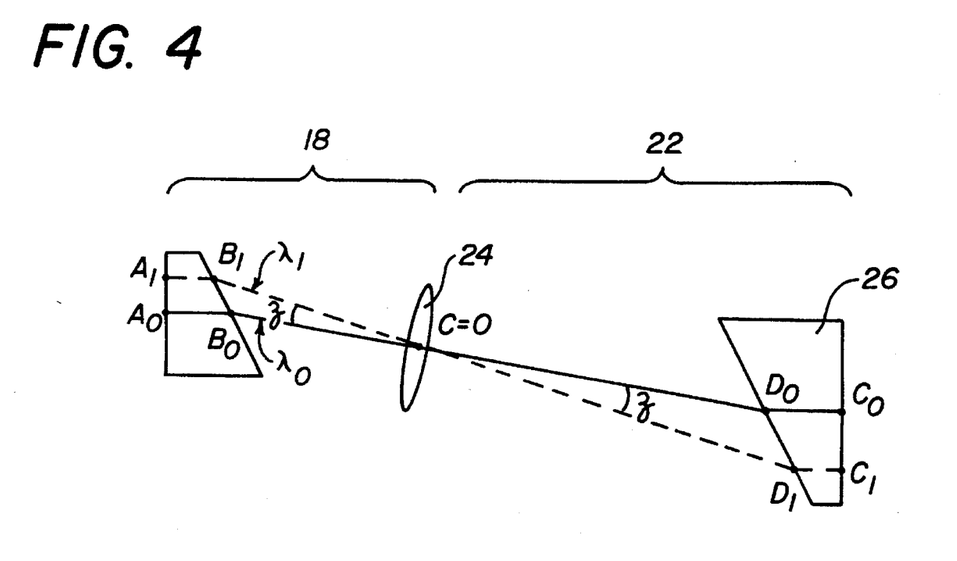
FIG. 4 a geometric diagram corresponding to the laser configuration of FIG. 1.

Considering a design of the laser of FIG. 1 to achieve a prespecified net negative dispersion, a quantitative analysis of the laser dispersion is possible by theoretically dividing the laser cavity into two parts, one on either side of the intersection point of the coexisting propagation axes, as shown in FIG. 4. The gain medium 12 is shown in the short arm of the laser 18, and the prismatic output coupler 26 is shown in the long arm of the laser 22, with the curved mirror 24 shown schematically as a lens. For simplicity of analysis, it is assumed that the intersection point of any two coexisting propagation axes corresponding to, for example, $\lambda_0$ and $\lambda_1$ falls on the curved mirror, as would be the case if the gain element and output coupler had identical dispersive properties. As explained above, this assumption would be exact if the gain medium and output coupler are composed of materials having identical $dn/d\lambda$. It turns out that such an assumption is a good approximation for the present laser because the dispersion of the LAKL21 glass prismatic output coupler is very close to that of sapphire, the gain medium. It must be emphasized, however, that neither this assumption nor an actual refractive index equality is required by the dispersion compensation scheme achieved by the invention; rather, as already stated above, this simplification is useful for providing an intuitive grasp of the dispersion compensation mechanism. As proven below, this scheme is readily extendible to a wide range of end element materials and the use of non-identical end elements in one laser geometry.

Figure 5:
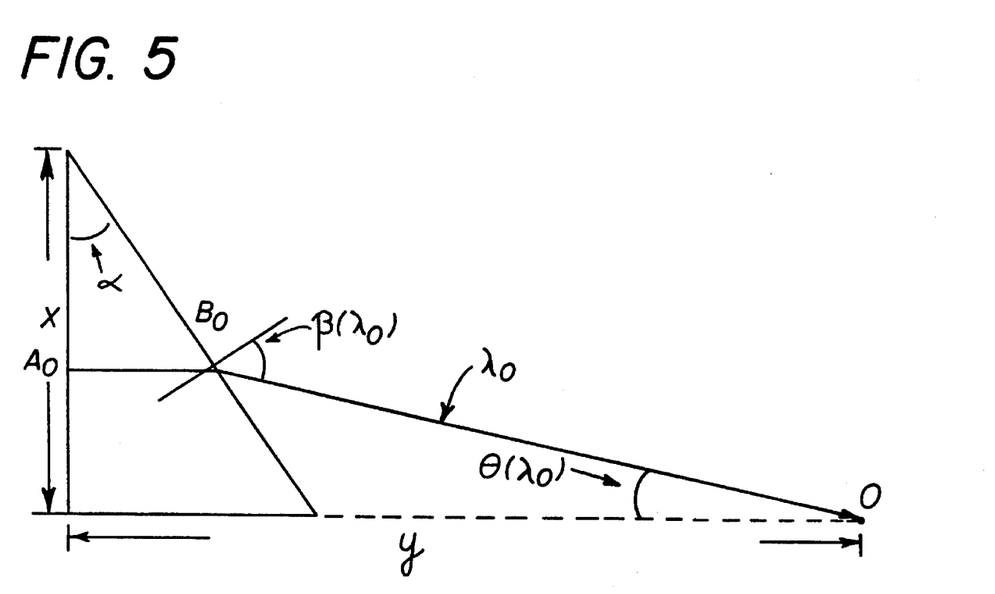
FIG. 5 is a diagram of an angular analysis of the geometry of FIG. 3.

FIG. 5 enables a derivation of an expression for the wavelength-dependent optical path length for each arm of the laser. The general derivation is the same for the two arms, owing to the similarity in components and geometry between the two arms. By geometrical constructions one can derive an expression for the wavelength-dependent optical pathlength in the laser cavity as $$P(\lambda) = x \sin \theta(\lambda) + y \cos \theta(\lambda) \tag{2}$$

where $P(\lambda)$ is the total optical path length for a given wavelength propagation axis, from an end element reflection surface' (e.g., surface 32 of FIG. 3) to the axes' intersection point, O, here defined to be the same as the center, C, of the mirror; x is the prism height, as shown in the figure, y is the perpendicular distance from the reflective prism surface to the axes' intersection point, shown as O; $\alpha$ is the apex angle of the prism; and $\theta$ is the angle between the path for one wavelength, $\lambda_0$, and the line perpendicular to the reflective surface that passes through the intersection point, O, as shown in FIG. 5.

As has been shown in the art, the net dispersion of the resonator is proportional to $d^2P/d\lambda^2$, which can be calculated since P is a function of the angle $\theta(\lambda)$, which is defined as a function of the deviation angle $\beta(\lambda)$, i.e., $\theta(\lambda) = [\beta(\lambda) - \alpha]$. $\beta(\lambda)$ is in turn a function of the wavelength-dependent refractive index, $n(\lambda)$. With these relations, and using the definition of the Brewster angle, one can express the dispersion due to the short arm 18 of the laser as $$d^2\phi/d\omega^2 = (\lambda^3/2\pi c^2)[d^2n/d\lambda^2(A_0B_0) - (dn/d\lambda)^2 B_0O] \tag{3}$$

where $A_0B_0$ is the propagation distance of the path P, corresponding to a center wavelength inside the end element material, $B_0O$ is the propagation distance in air from the Brewster interface to the axis intersection point, O, as shown in FIG. 5, and $n(\lambda)$ is the refractive index of the end element material, in this case sapphire, as a function of wavelength. The total path length P is the sum of the propagation distance $A_0B_0$ and the propagation distance $B_0O$. This equation shows how dispersion scales with the length of the arm, which is related to $B_0O$ and the material insertion, which is related to $A_0B_0$. Thus, negative dispersion can be increased by increasing the distance $B_0O$ or by varying the insertion of the prismatic end element in the beam, which then determines the pathlength $A_0B_0$ in the prismatic end element.

Performing an identical analysis for the long arm 22 of the laser yields an expression for the dispersion of that arm as:

$$d^2\phi/d\omega^2 = (\lambda^3/2\pi c^2)[d^2n/d\lambda^2(C_OD_O) - (dn/d\lambda)^2 D_O O] \quad (4)$$

where $C_O$ and $D_O$ are the propagation distances defined in FIG. 4 and n(λ) is the refractive index of the end element material, in this case, LAKL21, as a function of wavelength.

Equations (3) and (4) are used to estimate the dispersion for the present laser by estimating the dispersion for each laser arm (18 and 22 in FIG. 1), using the appropriate parameters for each arm. For sapphire at 800 nm, $dn/d\lambda = -0.0267961$ μm$^{-1}$, and $d^2n/d\lambda^2 = 0.0640994$ μm$^{-2}$, while for LAKL21 glass at 800 nm, $dn/d\lambda = -0.0261987$ μm$^{-1}$, and $d^2n/d\lambda^2 = 0.065655$ μm$^{-2}$. Using these values, with $A_0B_0 = 3.2$ mm, $B_0O \sim 1.94$ cm, and $C_0D_0 = 0.5$ mm, and a central wavelength of 800 nm, it is predicted that the second arm length, in which the prismatic end element and output coupler is positioned, should be approximately 41 cm-long to provide −100 fs$^2$ of round-trip net intracavity dispersion.

Figure 6:
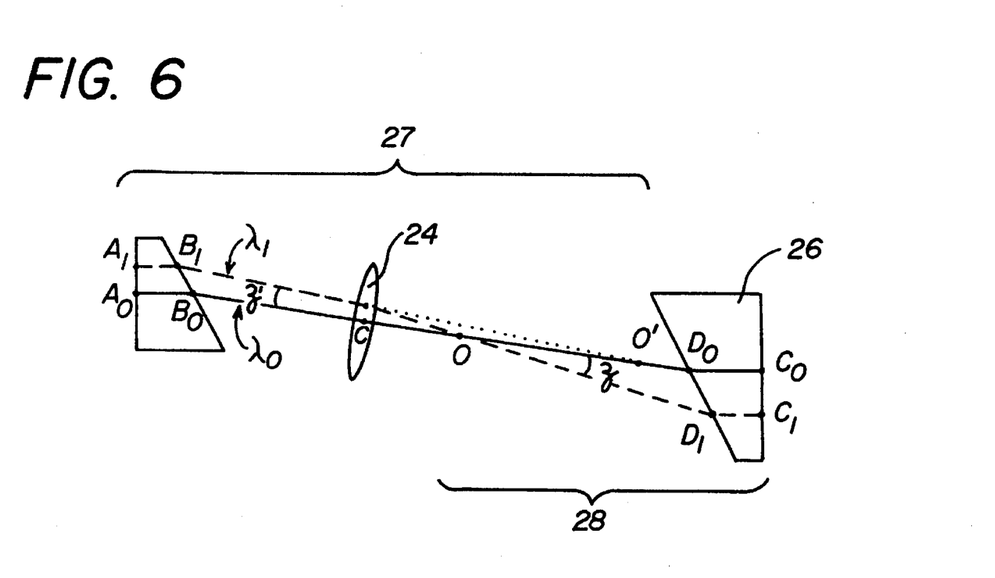
FIG. 6 is a second geometric diagram corresponding to the laser configuration of FIG. 1.

Turning to FIG. 6, this analysis may be generalized to the case of non-identical materials for the prismatic gain element and end element. In this case, application of the three constraints on propagation axes, described above, results in the intersection of all propagation axes at an intracavity point O which is now distinct from C, the center of the focusing element. Proceeding as before to separate the cavity dispersion calculation into two parts, the two parts (27 and 28 in the figure) are defined using point O and its virtual image, O', through the lens C. Based on this geometric construction, it can be shown that $$B_0O' = B_0C - f[1 - z/z'] \quad (5)$$

and $$D_0O = D_0C - f[z'/z - 1] \quad (6)$$

where z and z' are angles as defined in FIG. 6 and f is the focal length of the lens. These geometric expressions show that the displacements of O and O' from C, the center of the lens, are a function of the ratio of z/z', which in turn is dependent on the ratio of the values of dn/dλ, for the two materials composing the prismatic gain element and end element.

With this analysis, it is then understood that the total round-trip cavity dispersion may in this case be derived in a manner analogous to that for equation (3) and is given as $$d^2\phi/d\omega^2 = 2(\lambda^3/2\pi c^2)[d^2n/d\lambda^2(A_0B_0)(dn/d\lambda)^2 B_0O'd^2n'/d\lambda^2(C_0D_0) - (dn'/d\lambda)^2 D_0O] \quad (7)$$

where $A_0$, $B_0$, and n refer to parameters in the area indicated as 27 in FIG. 6 and $C_0$, $D_0$, and n' refer to parameters in the area indicated as 28 in the figure. With these definitions, equation (7) is evaluated at a central wavelength, $\lambda_0$, that passes through the center C of the lens.

Applying this generalized expression (7) to the laser of FIG. 1, with a prismatic output coupler element composed of LAKL21 glass, it is found that the intersection point O is displaced by about 1 mm from the center C of the lens. Since this distance is quite small compared to the length of the long arm 22, the earlier approximation that points O and O' coincide with the lens center C is shown to be justified.

The inventors herein have demonstrated operation of a negative dispersion laser based on this geometric analysis, and have found that minor empirical optimization is often required to achieve maximum laser performance. For the present laser, it was found that a length of 36.5 cm for the second arm optimizes laser performance. Such empirical optimization is not unusual, as will be recognized by those skilled in the art, because numeric calculations can produce only estimates of negative dispersion values. For example, the analysis above of the present laser used to estimate a value of dispersion does not take into account phase-related phenomena associated with the pumped gain medium, such as self-phase modulation or gain-dependent phase distortions. Further, the exact positions of the gain element and output coupler, which determine the values of $A_0B_0$ and $B_0O$ (FIG. 5), strongly effect the calculated value of dispersion and are hard to measure very accurately. Previous techniques to determine dispersion introduced by prism pairs have also relied on approximate theoretical estimates for a numerical dispersion value, which is then modified after experimental optimization. But as will be understood by those skilled in the art, such optimization is routine and effective. For example, because pulsed laser operation in the negative dispersion regime does not critically depend on the exact value of negative dispersion, and indeed a wide range of dispersion values are acceptable, the analysis used above has proven to be quite adequate in setting pulsed laser design parameters.

The laser described above with a long arm length of 36.5 cm has been shown to produce a stable train of 54 fs pulses at a repetition rate of 385 MHz. The pulse duration is 54 fs assuming a sech$^2$ pulse shape and has a spectral bandwidth of 17.9 nm, corresponding to 1.35 times the transform limit. Modelocking is obtained by operating close to the inner stability boundary of the cavity. Approximately 100 mW of output power is obtained with a pump power of 3.5 W Once CW performance is optimized, as understood by those skilled in the art, modelocking is achieved by adjusting the distance of the pump lens to the gain medium and the transverse position of the pump lens in relation to the gain medium. Under some conditions, self-starting can be achieved; otherwise modelocking is initiated by a small mechanical perturbation, as is common in the art. Once modelocking is achieved, the laser remains stably modelocked for hours.

It must be recognized that other embodiments of the invention are within the scope and spirit of the claims. For example, as previously explained, the analysis presented above is equally applicable to laser geometries employing a gain medium of a material that is substantially different from the prismatic end element. The general underlying principle is that given any selected gain element, focusing element, and laser geometry that can support multiple coexisting, spatially separated propagation axes, a prismatic end element can be selected and positioned such that a desired dispersion is produced. A prismatic end element of SF10 glass, which has a dn/dλ significantly higher than that of Ti:Sapphire, for example, may be given a prespecified position to achieve negative intracavity dispersion using the analysis above. In this case, a set value of dispersion compensation can be achieved using a shorter cavity length than for the LAKL21 case. The inventors herein have demonstrated such a laser, achieving 105 fs pulses at a repetition rate of close to a gigahertz. Thus, it may be confidently stated that this basic analysis is sufficient to design such lasers in quite a general fashion.

In other embodiments of the invention, a gain medium alternative to Ti:sapphire may be employed—including media such as Cr: LiSrAlF$_6$, Cr$^{3+}$: LiCaAlF$_6$, Cr$^{4+}$: YAG, Cr: Forsterite, Nd: YAG, and Nd: YLF, as well as media currently under development.

Figure 2A:
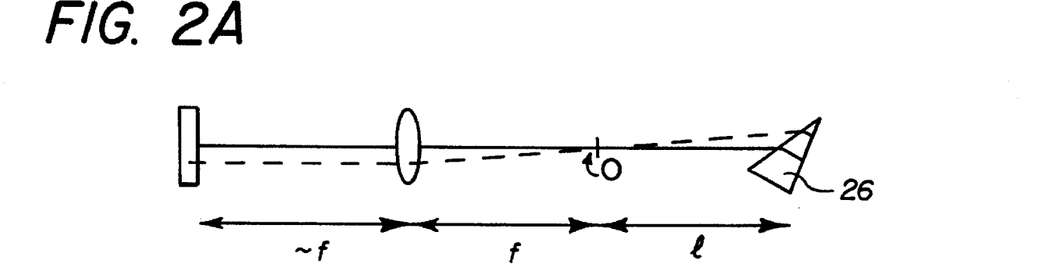
FIGS. 2A–2C are three schematic diagrams of alternative lasers according to the invention.
Figure 2B:
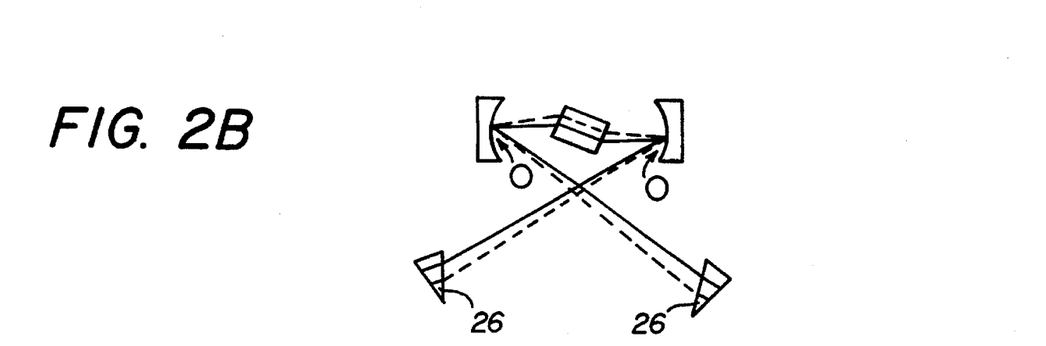
Figure 2C:
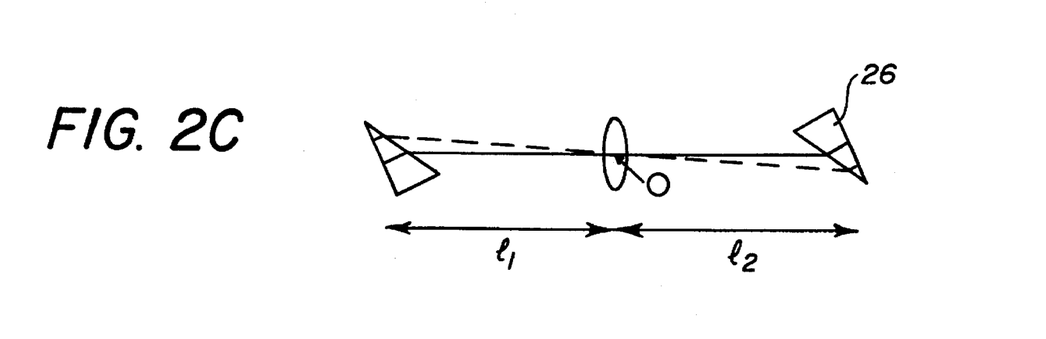

Importantly, the inventive use of a prismatic end element for dispersion compensation is applicable to a wide range of laser geometries, and while the embodiment described above utilized the end element as an output coupler, such utilization is not a requirement of the invention, but is quite advantageous in reducing the complexity of a laser. FIGS. 2A–2C show several quite generalized laser geometries that each support multimodal coexistence (note two self-consistent paths in each laser configuration) and achieve a net negative dispersion by including a prismatic end element whose position is determined based on the analysis above. Indeed, passive and active modelocking lasers fall within the dispersion compensation technique of the invention, as do lasers not dependent on such modelocking capability. The laser cavity may have arbitrary complexity, including one or more mirrors, lenses, and more than one prismatic end element, so long as it permits the coexistence of monochromatic modes propagating along spatially separated axes. The existence of a prismatic end element 26 which provides angular dispersion is the basis for achieving desired negative dispersion in any of these cavities. As is clear from the discussion above, it is this element that forces the different propagation axes to follow different paths and thus provides a mechanism for controlling intracavity dispersion based on the cavity geometry and the end element material.

Each of the laser geometries in FIGS. 2A–2C illustrate that the particular geometry of a laser strongly influences the path of propagation axes for different wavelengths coexisting in the laser. However, the positioning of one or more prismatic end elements 26 allows for each of the cavities to provide a unique path for coexisting wavelengths in the cavity. Thus, it is clear that the amount of dispersion, or more particularly, the amount of negative dispersion introduced by the presence of a prismatic end element, is dependent on the particular cavity geometry and material of a given laser, but is achievable using the analysis above.

Considering the embodiment of FIG. 2A, and applying the constraints described above to determine the propagation axes for different wavelengths in the cavity, it can be shown that these axes must intersect a focal length, f, away from the focusing element in order to propagate self-consistently in the cavity. In this configuration, the cavity will again provide negative dispersion because shorter wavelengths propagate through less material in the prismatic end element 26 than longer wavelengths. The amount of negative dispersion achieved will be proportional to the distance 1.

FIG. 2B illustrates a symmetrized version of the laser design of FIG. 1, as can be seen by drawing a symmetry plane through the center of the gain crystal, and can therefore be analyzed by the same analysis presented above for each symmetrical part of the resonator. FIG. 2C illustrates the preferred embodiment described in detail above, with the curved mirror here replaced by a lens. The dispersive properties of this laser geometry are therefore seen to be identical to that of the laser of FIG. 1 except for the positive material dispersion added by the lens.

In other embodiments, the gain medium is pumped by, for example, a diode pumping mechanism, or other appropriate mechanism, and the surfaces of the gain medium may be coated with any appropriate coating material to achieve a desired lasing bandwidth and reflectivity. The angle of the faces of the gain medium and the one or more prismatic end elements may be set to any suitable angle, while those skilled in the art will recognize the advantage of Brewster's angle.

The invention is thus seen to provide a compact and elegantly simple solution for achieving dispersion compensation and prespecified negative dispersion in a generalized laser geometry. The invention is accordingly not meant to be limited by the description, but by the spirit and scope of the claims.

We claim:

1. A laser comprising:
 a resonant cavity defined by a set of reflective end elements positioned to together form a closed optical path,
 a gain medium positioned along the closed optical path,
 means for exciting the gain medium to produce a laser beam within the cavity,
 at least one focusing element, the focusing element being positioned within the resonant cavity in optical alignment with the gain medium to shape a spatial mode for each wavelength in the laser beam that is supported by the laser, and
 a prism positioned as at least one of the end elements of the cavity and providing angular dispersion of the laser beam, said at least one prism having two surfaces at an angle with respect to each other, at least one of the two prism surfaces being coated with a reflective coating,
 all of the resonant cavity elements being positioned with respect to each other such that the resonant cavity supports a coexistence of a plurality of laser modes that each have a distinct propagation axis, such that propagation axes of modes having relatively longer wavelengths traverse more of the prism than propagation axes of modes having relatively shorter wavelengths, thereby resulting in addition of a negative component to the resonant cavity group velocity dispersion.

2. The laser of claim 1 wherein the prism is distinct from the gain medium.

3. The laser of claim 2 wherein only one focusing element is positioned within the resonant cavity in optical alignment with the gain medium.

4. The laser of either of claims 2 or 3 wherein the prism comprises an output coupler for extracting the laser beam from within the resonant cavity.

5. The laser of either of claims 1 or 3 wherein the gain medium comprises a solid state medium.

6. The laser of claim 2 wherein the gain medium comprises a semiconductor medium.

7. The laser of claim 2 wherein the gain medium comprises a solid state medium.

8. The laser of claim 7 wherein the means for exciting the gain medium is a diode pump.

9. The laser of claim 7 wherein the means for exciting the gain medium comprises a laser pump.

10. The laser of claim 9 wherein the gain medium comprises a crystal having two surfaces at an angle with respect to each other such that the crystal is flat-Brewster cut.

11. The laser of claim 9 wherein the gain medium comprises a titanium:sapphire crystal.

12. The laser of any of claims 1, 2, or 3 wherein the prism is characterized by an index of refraction n, where $n=n(\lambda)$, $\lambda$ being a laser mode wavelength.

13. The laser of claim 2 wherein the two surfaces of the prism are at the complement of the Brewster angle for the prism.

14. The laser of claim 13 wherein the prism comprises LAKL21 glass.

15. The laser of claim 13 wherein the prism comprises SF10 glass.

16. The laser of claim 2 wherein a combination of at least one of the resonant cavity elements is characterized by a saturable absorber mechanism that supports passive modelocking of the laser beam.

17. The laser of claim 16 wherein at least one of the resonant cavity elements comprises a material characterized by a nonlinear index of refraction that supports Kerr-lens modelocking of the laser beam.

18. The laser of claim 17 wherein all of the resonant cavity elements are positioned with respect to each other to define a laser cavity closed optical path that supports a laser beam comprising pulses of less than one picosecond in duration at a repetition rate greater than 100 MHz.

19. The laser of either of claims 2 or 3 wherein the gain element is positioned a distance of about one focal length from the focusing element.

20. The laser of claim 19 wherein the prism is positioned a distance from the focusing element that is sufficient to provide net negative intracavity dispersion.

21. The laser of any of claims 1, 2, or 3 wherein a combination of at least one of the resonant cavity elements modulates cavity gain of the laser to thereby modelock the laser.

22. The laser of claim 2 wherein the at least one focusing element comprises at least two focusing elements, each of the at least two focusing elements being positioned within the resonant cavity in optical alignment with the gain medium.

23. A method for compensating for group velocity dispersion of a laser beam generated in a resonant cavity defined by a set of reflective end elements positioned to together form a closed optical path, a gain medium positioned along the closed optical path, a means for exciting the gain medium to produce the laser beam within the cavity, and at least one focusing element, the focusing element being positioned within the resonant cavity in optical alignment with the gain medium to shape a spatial mode for each wavelength in the laser beam that is supported by the laser, the method comprising the step of:

passing the laser beam generated within the resonant cavity through a prism positioned as at least one of the end elements of the cavity and providing angular dispersion of the laser beam, each of the at least one prisms having two surfaces at an angle with respect to each other, at least one of the two prism surfaces being coated with a reflective coating, all of the resonant cavity elements being positioned with respect to each other such that the resonant cavity supports a coexistence of a plurality of laser modes that each have a distinct propagation axis, such that propagation axes of modes having relatively longer wavelengths traverse more of the prism than propagation axes of modes having relatively shorter wavelengths, thereby resulting in addition of a negative component to the resonant cavity group velocity dispersion to compensate for group velocity dispersion of the laser beam.

24. The method of claim 23 wherein the prism is distinct from the gain medium.

25. The method of claim 24 wherein the gain medium comprises a solid state medium capable of supporting short laser pulsing.

26. The method of claim 25 wherein the gain medium comprises a titanium:sapphire crystal.

27. The method of claim 23 wherein the prism comprises an output coupler for extracting the laser beam from within the resonant cavity and only one focusing element is positioned within the resonant cavity in optical alignment with the gain medium.

28. The method of claim 23 wherein the prism is characterized by an index of refraction n, where $n=n(\lambda)$, $\lambda$ being a laser mode wavelength.

29. The method of claim 28 wherein the prism comprises LAKL21 glass.

30. The method of claim 28 wherein the prism comprises SF10 glass.

* * * * *

UNITED STATES PATENT AND TRADEMARK OFFICE
CERTIFICATE OF CORRECTION

PATENT NO : 5,553,093
DATED : September 3, 1996
INVENTOR(S): Malini Ramaswamy and James G. Fujimoto It is certified that error appears in the above-identified patent and that said Letters Patent is hereby corrected as shown below:

At Item 75 on the cover page, the name "Mailini" should read --Malini--.

At Item 56 on the cover page, under "Other Publications" the name "Dietal" should read --Dietel--; and the name "Cruz" should read --Brito Cruz--.

Col. 1, line 45 "soliron" should read --soliton--.

Col. 2, line 65, "together" should read --to together--.

Col. 4, line 11, "Fig. 4 a" should read --Fig. 4 is a--.

Col. 6, line 18, "soliron-like" should read --soliton-like--.

Col. 8, line 34, " surface' " should read --surface--.

Col. 9, Eqn. 7, line 51,

"$d^2\phi/d\omega^2 = 2(\lambda^3/2\pi c^2([d^2n/d\lambda^2(A_0B_0) (dn/d\lambda)^2B_0C'd^2n'/d\lambda^2(C_0D_0)-$"

should read:

--$d^2\phi/d\omega^2 = 2(\lambda^3/2\pi c^2)[d^2n/d\lambda^2(A_0B_0) (dn/d\lambda)^2B_0C' + d^2n'/d\lambda^2(C_0D_0)$- --.

Col. 10, line 67, "LiSrA1F$_6$" should read --LiSrAlF$_6$--.

Col. 12, claim 10, line 3, "fiat-Brewster" should read --flat Brewster--.

Signed and Sealed this

Second Day of June, 1998

Attest:

BRUCE LEHMAN

Attesting Officer

Commissioner of Patents and Trademarks